United States Patent Office 3,459,070
Patented Aug. 5, 1969

3,459,070
WHEEL DRIVE MECHANISM
John W. Holdeman, Auburn, Ind., assignor to Borg-Warner Corporation, Chicago, Ill., a corporation of Illinois
Filed July 3, 1967, Ser. No. 650,949
Int. Cl. F16h 37/06, 35/00
U.S. Cl. 74—705                    10 Claims

ABSTRACT OF THE DISCLOSURE

A planetary transmission mounted within a wheel and connected to drive the wheel including first and second gear sets having a drive shaft extending through said gear sets and connected to drive a sun gear element, the elements of the first and second gear sets being permitted a semi-floating or self-aligning movement, a common ring gear for said first and second gear sets the ring gear being drivingly connected to the vehicle wheel.

SUMMARY OF THE INVENTION

In known prior art transmissions of the type including a planetary transmission mounted within the center of a driving wheel it has been common practice to provide fixed bearing support for the elements of the transmission in which misalignment of the transmission parts is not allowed thereby creating problems in that misalignment due to manufacturing defects or road damage would cause rapid wearing of the transmission elements.

The present invention comprises an improved planetary transmission adapted to be mounted within a vehicle drive wheel in which the drive shaft for the transmission extends through the transmission having a drive sun gear thereon. The drive shaft is allowed to flex slightly so that said driving sun gear is self-aligning and including a spur gear within the transmission being supported only by its meshing engagement with pinion gears whereby the spur gear is also self-aligning. The ring gear for said transmission being rotatably mounted on a wheel support and integral with said driving wheel.

DESCRIPTION OF THE DRAWINGS

Referring to FIGURE 1, there is shown a planetary transmission 10 mounted within a wheel 11 so as to drive the wheel at a reduced speed ratio. A drive shaft 12 is shown connected to the transmission. The drive shaft 12 is driven from a common differential or final drive unit (not illustrated) of the vehicle.

Figure 1:
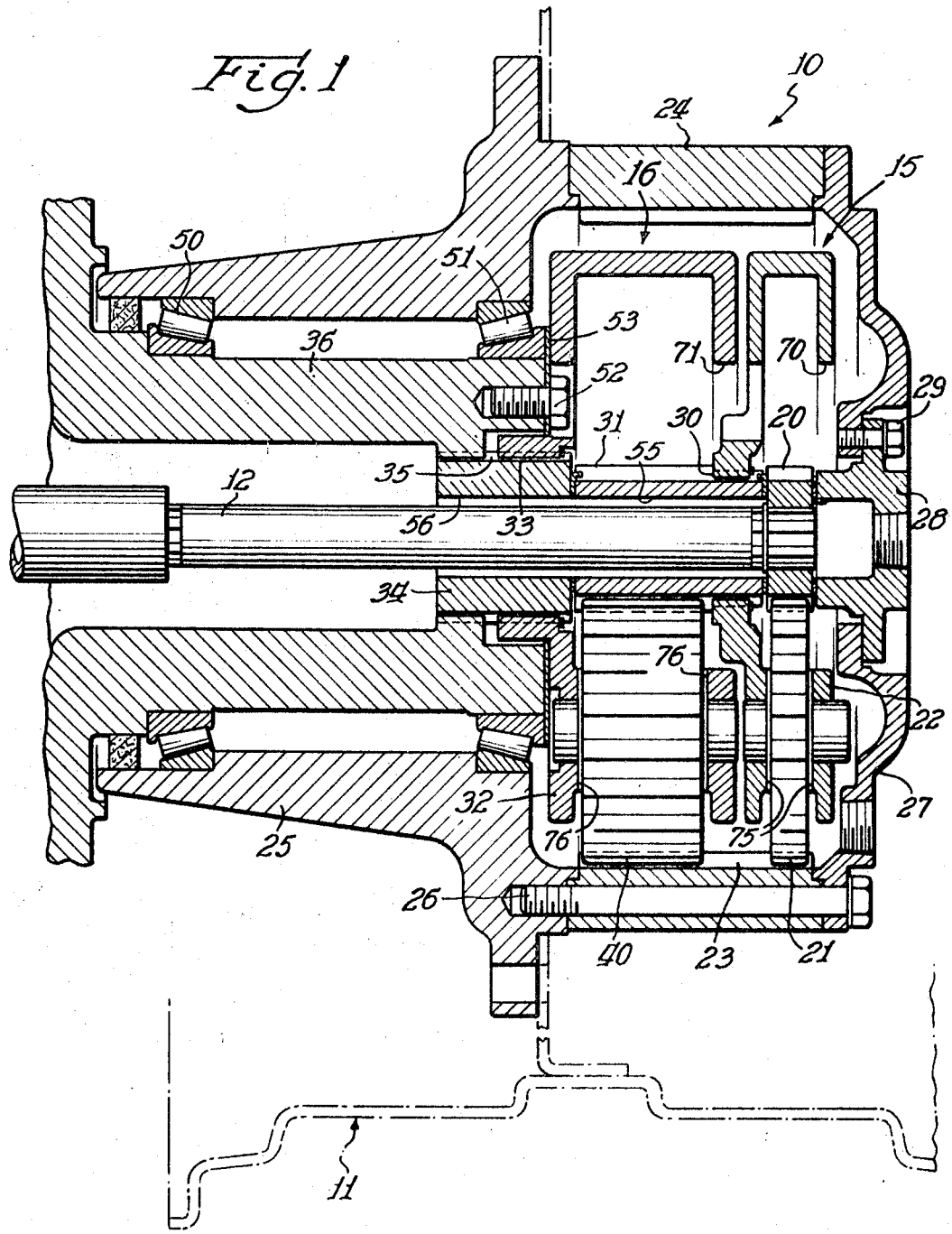
FIGURE 1 is a longitudinal sectional view through a drive wheel showing the transmission of the present invention.

The transmission 10 includes a planetary gear set 15 and a second gear set 16. The planetary gear set 15 includes a driving sun gear 20 which is drivingly connected to and mounted on the drive shaft 12. As will be indicated later, the drive shaft 12 has a certain amount of inherent flexibility therein and the sun gear 20 is mounted on the end of the drive shaft 12 so that the sun gear is semi-floating and self-aligning in its driving relation with the planetary gear set so as to provide for equal tooth load and thereby improved wear of the gear teeth.

The sun gear 20 drives a plurality of planet pinion gears 21 which may be three or more in number and are mounted on a planetary carrier 22. The planet pinion gears 21 also mesh with a ring gear 23 which is formed within a drum member 24.

The drum member 24 is assembled or connected to a rotatable wheel support 25 by bolts 26, for example, although other suitable means of securing may be utilized. Ring gear 23 could also be formed integral with support 25. The driving wheel 11 is suitably secured to the support 25 for rotation of the wheel 11 by the support 25. Also secured to the drum by the bolts 26 is an end cover 27 which is easily removable by removal of the bolts 26 for servicing the planetary transmission since the end cover 27 as mounted in the vehicle would be toward the outside of the wheel 11. An optional access cover 28 may also be provided secured to end cover 27 by suitable means such as bolts 29. The cover 28 is provided if desired so that the sun gear 20 may be removed therethrough to facilitate towing of the vehicle.

Thus the planetary gear set 15 tends to drive the ring gear 23 at a particular ratio, the ring gear 23 being the output gear of the planetary set connected to drive the wheel 11.

The planetary carrier 22 is splined at 30 for driving connection to a spur gear 31 of the second gear set 16. A gear support 32 is provided which serves as the reaction element for planetary gear set 15. The gear support 32 has splines 33 engaging splines 35 on a drive sleeve 34. Drive sleeve 34 is connected to a fixed wheel support 36 by the splines 35; fixed support 36 serves to support the entire wheel drive mechanism and is attached to a vehicle frame in a suitable manner in the vehicle. The carrier 32 has a plurality of pinion gears 40 thereon which drivingly engage the ring gear 23. Thus a second input drive is provided to the ring gear 23 from the pinion gear 40, the gear support 32 being held stationary. As the sun gear 20 drives the carrier 22 of the planetary gear set and thereby drives spur gear 31 of the second gear set, the pinions 40 will drive the ring gear 23 and thus the wheel 11.

The rotatable support 25 is mounted on the fixed support 36 by bearings 50 and 51 at either end of the fixed support 36 and between the fixed support 36 and the rotatable support 25. Bolts 52 are provided in the fixed support 36 which urge a retainer 53 against the bearing 51 to retain the bearings 50 and 51 in position.

The spur gear 31 of the second gear set has a central bore 55 therethrough of larger diameter than the drive shaft 12. The drive sleeve 34 also has a central bore 56 therethrough larger than the diameter of the drive shaft 12. Thus the spur gear 31 and the carrier 22 are also semi-floating and may move in such a manner as to be self-aligning within the drive train. Drive sleeve 34 is also semi-floating allowing the carrier 32 to assume a self-aligning position within the transmission.

The planetary transmission 10 as described has a great amount of flexibility of the parts thereof to provide the self-aligning feature and thereby provide for equal loading of the gear teeth of the transmission. Although self-alignment is allowed the planetary gear set is properly supported by the fixed wheel support 36 and rotatable wheel support 25. The ring gear 23 supported by support 25 in essence is serving as a support for the elements of the planetary transmission.

Planetary carrier 22 has relatively large bores or openings 70 therein and gear support 32 has relatively large bores or openings 71 therein of the same size as openings 70. A series of the openings 70 and 71 are provided around the planetary carrier 22 and gear support 32 and are in the form of circular bores therethrough. The relatively large openings 70 and 71 are provided so as to provide easy access for machining so that a boring bar can be used to machine surfaces 75 provided in carrier 22 and surfaces 76 provided in gear support 32. The surfaces 75 and 76 being located at the points where the pinion gears are mounted and acting as the bearing pads for the pinion gears.

The elements 22 and 32 are of identical diameters (although the element 32 is wider) so as to provide for machining of the same on the same boring machine. Further, the forming required for the elements 22 and 32 may be performed on similar equipment.

Due to the relative floating nature of the elements of the planetary transmission 10 of the present invention equal tooth loads are provided on the elements of the planetary gear set and provide a transmission much improved over those known in the prior art. Known prior art devices incorporating planetary transmissions within a wheel provide relatively fixed structures with fixed bearing supports for the elements of the planetary gear set not allowing for misalignment and improved tooth load characteristics as provided in the self-aligning type transmission such as described above. Further, due to the use of the compound planetary set provided, the tooth loads are well distributed so that the relatively compact planetary transmission 10 can handle relatively large drive loads. It can be seen that the compactness of the planetary gear set in a radial sense is important so that the drive may fit within a wheel although a large load capacity for driving the wheel is still required.

Also due to the construction described above each servicing of the planetary transmission unit is provided since by removal of the bolts 26 easy access is provided to all the transmission elements. The transmission may be pulled out for servicing after the cover 27 is removed.

With the transmission arrangement of FIGURE 1 a wide range of gear ratio may be provided depending on the number of teeth provided on the elements of the gear set. The following table is exemplary of the ratios available:

GEAR RATIOS FOR AN 8 INCH WHEEL

| Ratio | Number of Teeth | | |
|---|---|---|---|
| | Ring | Gears 20 and 31 | Pinions |
| 22.04:1 | 76 | 20 | 28 |
| 24.52:1 | 77 | 19 | 29 |
| 27.44:1 | 78 | 18 | 30 |
| 30.89:1 | 79 | 17 | 31 |
| 35.00:1 | 75 | 15 | 30 |
| 35.00:1 | 80 | 16 | 32 |
| 39.96:1 | 81 | 15 | 33 |

The range of ratios may be extended by having different numbers of teeth on the gears 20 and 31. The ratios may be determined by the following formulas in which R is ring gear 23, S is sun gear 20 and $S_2$ is spur gear 31:

$S_1$ and $S_2$ same size:
$$\text{Ratio} = -\frac{R}{S}\left(\frac{R}{S}+2\right)$$

$S_1$ and $S_2$ different size:
$$\text{Ratio} = -\frac{R}{S_2}\left(1+\frac{R}{S_1}+\frac{S_2}{S_1}\right)$$

Figure 2:
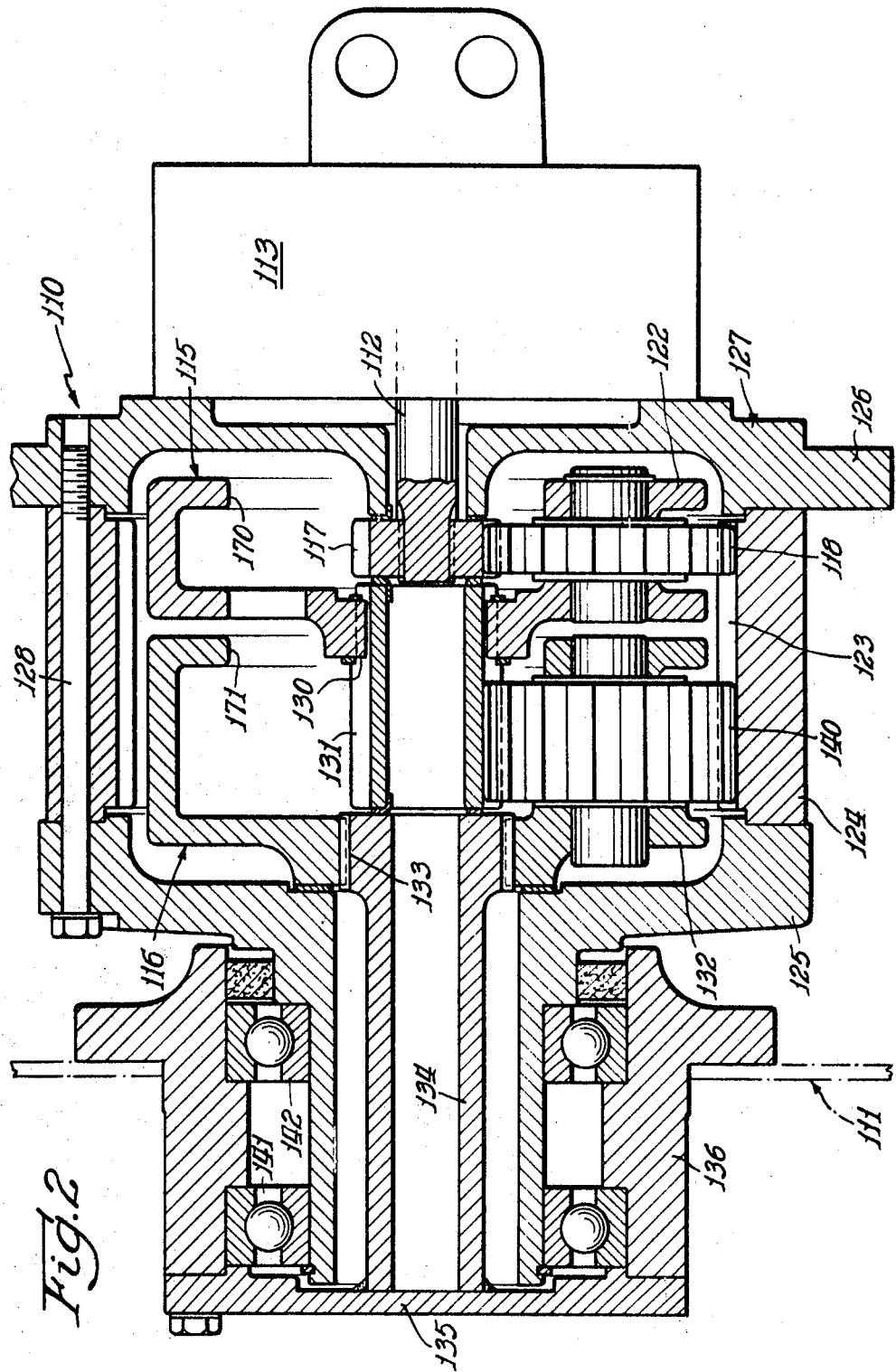
FIGURE 2 is a similar view of a modified form of the invention.

Referring to FIGURE 2 a modified form of the present invention is illustrated which is easily adaptable to include a fluid drive motor at the wheel as is being used in certain off the road and other special vehicles. The device of FIGURE 2 includes a driving wheel 111 of a vehicle, a drive shaft 112 is provided for driving the vehicle wheel 111. The drive shaft 112 is adapted to be driven by a fluid motor 113 provided on the wheel which may be of any known type but would preferably be of the radial piston type of fluid motor so as to provide for compactness in an axial direction.

Similar to the device of FIGURE 1, the planetary transmission 110 of FIGURE 2 includes a first planetary gear set 115 and a second planetary gear set 116. The first planetary gear set 115 includes a sun gear 117 splined to the drive shaft 112. Meshing with the sun gear 117 is a plurality of planet pinion gears 118 mounted on a planetary gear carrier 122. Also meshing with the planetary pinion gears 118 is a ring gear 123 which is formed on a drum 124. The drum 124 comprises a part of a wheel support 125 for the vehicle wheel and transmission assembly.

The wheel support 125 further includes a flange 126 which is adapted to be connected in any suitable manner to the vehicle frame. The support 125 is a fixed support, thereby the ring gear 123 is the reaction element for the planetary gear sets 115 and 116. An end plate 127 is provided. The end plate 127, drum 124 and support 25 are secured together by bolts 28.

The planetary carrier 22 has splines 130 thereon drivingly connected to the sun gear 131 of the secondary planetary gear set 116. Sun gear 131 is in mesh with a plurality of planetary pinion gears 140. The planetary pinion gears 140 are rotatably mounted on a planetary carrier 132. The planetary carrier 132 comprises the output element of the planetary transmission 110.

Planetary gear carrier 132 is connected by splines 133 with a hollow driven shaft 134. The driven shaft 134 is integral with an end plate 135. The end plate 135 is secured to a rotatable wheel support 136 to which the driving wheel 111 is fixed in any suitable manner. The support 136 is mounted on the fixed support 125 by a pair of bearings 141 and 142.

Planetary pinion gears 140 of the second planetary set 116 also mesh with the fixed ring 123. Thus a double reduction type of planetary drive is provided from the drive shaft 112 through sun gear 117, planetary gear carrier 122, second sun gear 131, planetary pinions 140, and planet carrier 132 to the driving wheel 111 of the vehicle. As in the embodiment of FIGURE 1, a clearance is provided within the end plate 127 which is part of the support 125 accommodating drive shaft 112 so as to provide for slight flexing of the drive shaft 112 and thereby a slight floating or self-aligning movement. The driving sun gear 117 and the second sun gear 131 have no support except through the planetary pinion gears 118 and 140 and thus the second sun gear 131 is also allowed self-aligning movement in a radial sense.

Thus the embodiment of FIGURE 2 provides a compact planetary transmission providing a relatively large reduction ratio due to the double planetary reduction and also a gear set capable of handling relatively large drive loads. The arrangement is such that it is conveniently connected to be driven by fluid motor 113 mounted at the wheel. The planetary transmission 110 is flexible in nature allowing self-aligning of the driving elements as is the case with regard to the embodiment of FIGURE 1.

Further, the planetary carriers 132 and 122 of planetary transmission 110 include relatively large bores 170 and 171 as in the embodiment of FIGURE 1 providing easy access for machining of the surfaces against which planetary gears 118 and 140 engage.

Various of the features of the invention have been particularly shown and described; however, it should be obvious to one skilled in the art that various modifications may be made therein without departing from the scope of the invention.

I claim:

1. A planetary type wheel drive including a wheel support having a bore therethrough, a wheel rotatably mounted on said wheel support, a drive shaft extending through said bore having a sun gear fixed thereto, a planetary gear train driven by said sun gear and mounted in said wheel, said gear train including a ring gear connected to drive said wheel, a spur gear between said wheel support and said sun gear, said spur gear having a central bore through which said drive shaft extends, a carrier member drivingly connected to said spur gear and having a plurality of planet pinions meshing with said sun gear and said ring gear, a gear support, means floatably securing said gear support to said wheel support so as to be a reaction element for said gear set, at least one gear mounted on said gear support and meshing with said spur gear and said ring gear whereby said drive shaft drives said wheel at a reduced ratio through said gear set.

2. A planetary wheel drive as claimed in claim 1 wherein said drive shaft is permitted to flex allowing said sun gear to be semi-floating and thereby self-aligning.

3. A planetary wheel drive as claimed in claim 2 wherein clearance is provided between said spur gear and said drive shaft allowing said spur gear to be self-aligning.

4. A planetary wheel drive as claimed in claim 1 wherein said wheel is drivingly connected to a drum element rotatably journalled on said wheel support and having said ring gear formed internally thereof and integral therewith.

5. A planetary wheel drive as claimed in claim 1 wherein said means floatably securing said gear support to said wheel support includes a drive sleeve drivingly connected to said wheel support and said gear support and thereby allowing limited floating movement of said gear support.

6. A planetary wheel drive as claimed in claim 1 wherein said carrier element has internal splines thereon conforming to the teeth of said spur gear to provide a driving connection between said carrier element and said spur gear.

7. A planetary type wheel drive having a fixed wheel support having a bore therethrough, a driven shaft extending through said bore, an end plate on said wheel support having a central bore, a drive shaft extending through said end plate bore, a sun gear drivingly connected and mounted on said drive shaft, a planetary transmission mounted within said wheel support, said transmission comprising a first planetary carrier having gears rotatably journalled thereon meshing with said sun gear, a ring gear integral with said fixed wheel support also meshing with said planetary pinion gears, a second sun gear drivingly connected to said carrier, a second set of planetary pinion gears meshing with said second sun gear and journalled upon a second carrier element and also meshed with said ring gear, said second carrier element being drivingly connected to said driven shaft, said driven shaft being drivingly connected to a second wheel support upon which said wheel is drivingly mounted and said second wheel support being rotatably journalled on said fixed wheel support.

8. A wheel drive mechanism as claimed in claim 7 wherein said second sun gear is supported by its engagement with said second planetary pinion gears and said first carrier whereby said second sun gear is self-aligning.

9. A wheel drive mechanism as claimed in claim 7 wherein said bore through said fixed wheel support is of greater diameter than said driving shaft to allow said driving shaft to flex slightly to allow said sun gear to be self-aligning.

10. A wheel drive mechanism as claimed in claim 7 wherein said end plate is removable from said fixed wheel support to provide access to said planetary transmission.

References Cited

UNITED STATES PATENTS

| | | | |
|---|---|---|---|
| 1,221,626 | 4/1917 | Tadey | 74—705 |
| 2,386,917 | 10/1945 | Thornton | 74—391 |
| 3,107,987 | 10/1963 | Duer | 74—801 X |
| 3,150,532 | 9/1964 | Bixby | 74—391 |
| 3,188,888 | 6/1965 | Zink et al. | 74—801 |
| 3,217,826 | 11/1965 | Carter et al. | |
| 3,222,954 | 12/1965 | Wuertz | 74—801 |

ARTHUR T. McKEON, Primary Examiner

U.S. Cl. X.R.

74—391, 801